United States Patent
Wickersham et al.

(10) Patent No.: US 8,294,438 B2
(45) Date of Patent: Oct. 23, 2012

(54) CIRCUIT AND METHOD FOR PHASE SHEDDING WITH REVERSE COUPLED INDUCTOR

(75) Inventors: Robert D. Wickersham, Roy, WA (US); William Rider, Shelton, WA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 11/772,195

(22) Filed: Jun. 30, 2007

(65) Prior Publication Data

US 2009/0001945 A1   Jan. 1, 2009

(51) Int. Cl.
*G05F 1/00* (2006.01)
(52) U.S. Cl. .................................................. 323/237
(58) Field of Classification Search .......... 323/222, 323/237, 263, 361, 272
See application file for complete search history.

(56) References Cited

U.S. PATENT DOCUMENTS

| | | | | |
|---|---|---|---|---|
| 5,367,247 A * | 11/1994 | Blocher et al. | ................. | 323/222 |
| 6,037,757 A * | 3/2000 | Oliveira et al. | ................. | 323/241 |
| 6,429,709 B1 * | 8/2002 | Hall et al. | ................. | 327/175 |
| 6,433,527 B1 * | 8/2002 | Izadinia et al. | ................. | 323/300 |
| 6,504,351 B2 * | 1/2003 | Eagar et al. | ................. | 323/282 |
| 7,268,524 B2 * | 9/2007 | Kase et al. | ................. | 323/282 |
| 7,443,146 B2 * | 10/2008 | Wei et al. | ................. | 323/224 |
| 7,492,134 B2 * | 2/2009 | Tang et al. | ................. | 323/241 |
| 7,508,175 B2 * | 3/2009 | DeWitt et al. | ................. | 323/224 |
| 7,616,464 B2 * | 11/2009 | Phadke et al. | ................. | 363/79 |
| 7,706,151 B2 * | 4/2010 | Neidorff et al. | ................. | 363/9 |
| 2006/0012356 A1 * | 1/2006 | Kase et al. | ................. | 323/282 |
| 2006/0280019 A1 * | 12/2006 | Burton et al. | ................. | 365/226 |
| 2007/0013350 A1 | 1/2007 | Tang et al. | | |
| 2008/0238390 A1 * | 10/2008 | Trivedi et al. | ................. | 323/283 |
| 2009/0001945 A1 * | 1/2009 | Wickersham et al. | ........ | 323/263 |

OTHER PUBLICATIONS

Search report received for Taiwanese Patent Application No. 097124307 mailed on Sep. 26, 2011, 5 Pages of Search report including 1 page of English Translation.

* cited by examiner

*Primary Examiner* — Adolf Berhane
*Assistant Examiner* — Yemane Mehari
(74) *Attorney, Agent, or Firm* — Blakely, Sokoloff, Taylor & Zafman LLP

(57) ABSTRACT

In some embodiments, a regulator with a reverse coupled inductor is provided. It can operate in both a multi-phase and a phase shed mode. When in the phase shed mode, it has circuitry to provide a low resistance path for induced current.

14 Claims, 4 Drawing Sheets

US 8,294,438 B2

CIRCUIT AND METHOD FOR PHASE SHEDDING WITH REVERSE COUPLED INDUCTOR

BACKGROUND

The present invention relates generally to voltage regulators and in particular, to methods and circuits for phase shedding.

FIG. 1 shows a conventional 2-phase so-called buck-type DC-DC voltage converter (or regulator). It generally includes a controller 102, phase 1 transistor switches (upper transistor Q1, lower transistor Q2), phase 2 transistor switches (upper transistor Q3, lower transistor Q4), reverse-coupled inductor L1, and output capacitor C1, all coupled together as shown to provide a regulated Dc voltage to a load 104. The reverse coupled inductor L1 comprises first and second windings W1, W2 magnetically coupled to one another, as shown, with like polarities at nodes 1 and 2, on the one hand, and 3 and 4 on the other hand.

Each winding has associated leakage inductance ($L_L$), and the overall inductor has an associated magnetic inductance ($L_M$) such that when current is driven thorough either winding and provided to the load, an induced current is generated in the other winding and also provided to the load. The amount of induced current is: $L_M/(L_L+L_M)$ times the amount of current in the driven winding. As an example, if the windings each have leakage inductance ($L_L$) of 60 µH and the magnetic inductance is 140 µH, then the amount of induced current is 140/200 times the current in the driven winding. Thus, for example, if 10 A is driven through the first winding W1, then 7 A would be induced through winding W2, and the load would receive a total of 17 A. This circuit is sometimes referred to as a "current doubler" (even though the current is normally not quite doubled). (Note that with leakage inductance of 60 µH in each winding, each winding would actually see 120 µH of leakage inductance, which may be favorable since, among other reasons, leakage inductance serves to reduce ripple current and thus switching losses. It should also be appreciated that as used herein, the term: "reverse coupled inductor" refers to any magnetic and/or inductive structure, such as L1, with sufficient leakage inductance for implementing a buck regulator and suitable magnetic inductance for inducing a current in a winding based on a current driven in another winding, whereby the induced and driven currents can feed into a common load. "For example, with a two winding implementation, a two winding transformer with suitable leakage inductance in each winding could be used. On the other hand, a transformer with low leakage could be used in combination with separate inductors electrically coupled in series with each winding. Other structures, whether or not referred to as transformers, inductors, or combinations of the same could also work to implement a reverse coupled inductor.)

The controller controls the windings so that the first winding is driven during a first clock cycle phase (e.g., first half of a clock cycle), with the second winding being driven during the second phase. The controller achieves this by turning on Q1 and Q4 (with Φ1U and Φ2L asserted) during the first phase and turning on Q2 and Q3 (with Φ1L and Φ2U asserted) during the second phase. The controller modulates the duty cycles of the turn-on times in each phase to regulate the generated voltage at the load based on load demands, as indicated with feedback from the load. The result is a regulated DC voltage provided to the load to receive up to twice the current driven through the switch network. This can be an effective voltage regulator design, however, improved efficiencies, especially during low load conditions, may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

To improve regulator efficiency when load demands are reduced, multi-phase regulators may employ a technique known as phase shedding (or phase dropping). When load demands go down, one or more phases are shut down to improve regulator efficiency.

Figure 1:
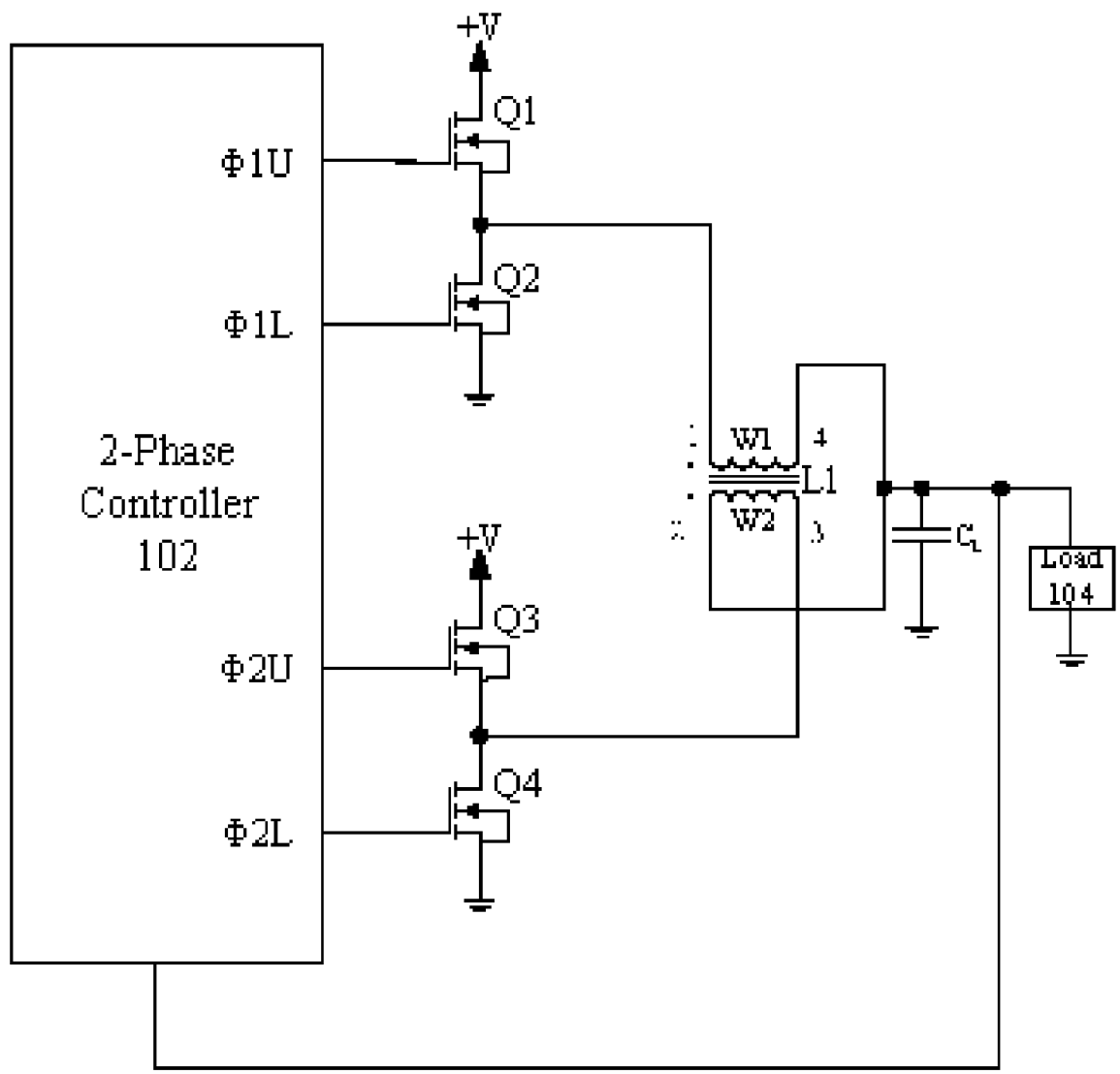
FIG. 1 is a schematic diagram of a conventional 2-phase buck-type regulator with a reverse coupled inductor.

Unfortunately, with a reverse coupled inductor (such as L1), when the active phase is driving current, it induces current through the inactive phase winding, which conducts through the body diode of the inactive phase's lower transistor. That is, the current has to come from some place and with the phase being inactive, the lower transistor (which would otherwise be turned on) is turned off. For example, with the circuit of FIG. 1, if phase 2 is shut down, when phase 1 drives current through winding 1, a current is induced through winding 2, but because phase 2 is shut down, Q4 stays off, causing the current through winding 2 to be pulled from ground through Q4's body diode. The body diode is a fixed voltage drop, which when current is applied dissipates more power than the I.sup.2R dissipation of the MOSFET's turned-on resistance.

Accordingly, embodiments of the invention address this issue. In some embodiments, the inactive phase lower transistor is turned on during the time when the active phase's upper transistor is turned on. This provides a reduced resistance across the inactive phase's lower transistor, as compared with if it was conducting through its body diode, thereby reducing the losses. In some embodiments, the turn-on of the inactive lower transistor may be delayed to provide time for the induced current to approach zero from the positive direction. Similarly, its turn-off may also be delayed to allow the current to approach zero from the negative direction.

Figure 2:
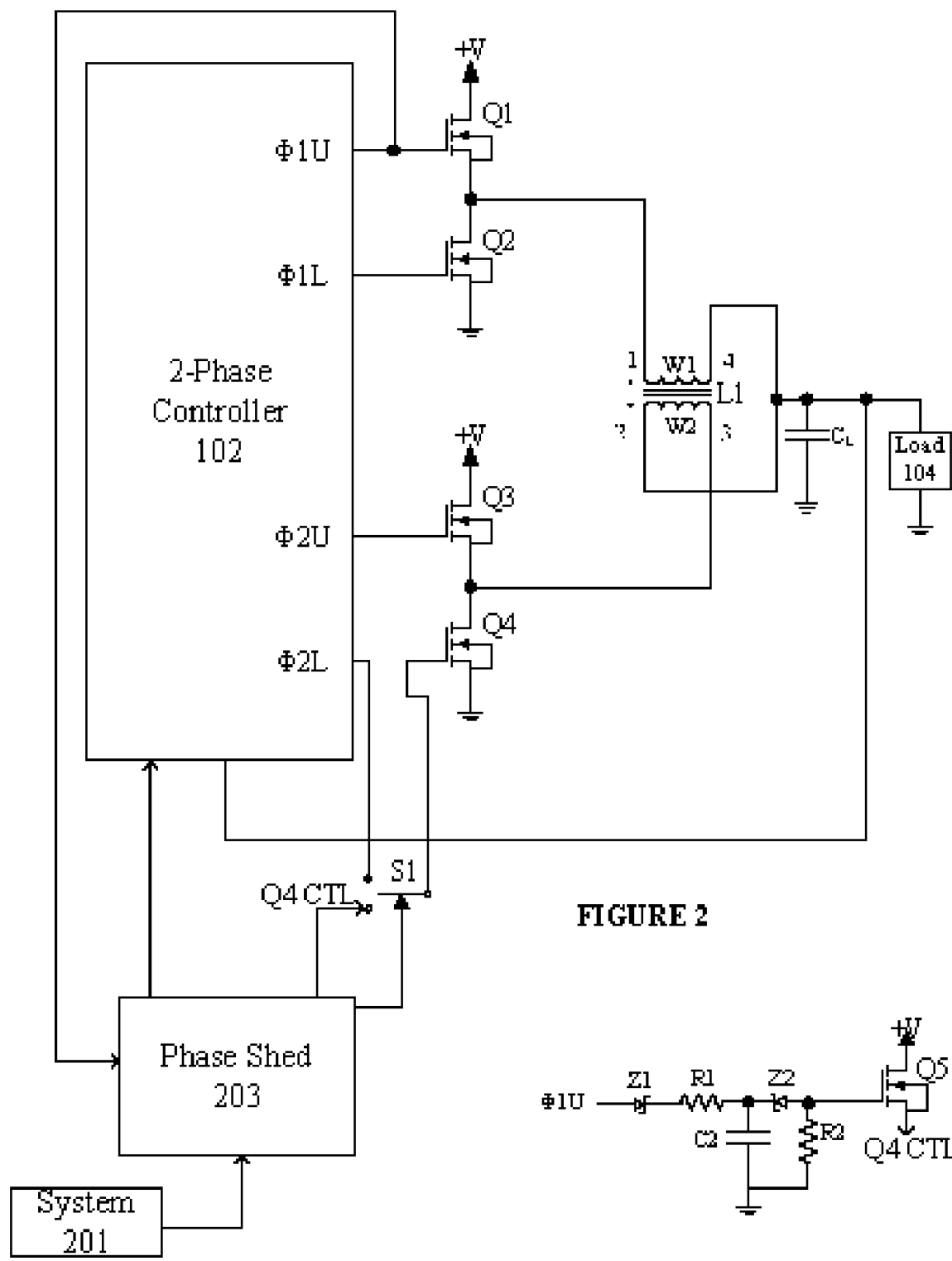
FIG. 2 is a schematic diagram of a 2-phase buck-type regulator with a reverse coupled inductor with phase shedding capability in accordance with some embodiments.

FIG. 2 shows a 2-phase regulator with a reverse coupled inductor and phase shed circuitry in accordance with some embodiments. It's similar to the regulator of FIG. 1, but it also has a phase shed circuit 203 and a switch S1 to allow the phase shed circuit 203 to selectively switch control of the phase 2 lower transistor (Q4) gate between the controller 102 (Φ2L) and the phase shed circuit 203 (Q4 CTL). The phase shed circuit block is coupled to a system control 201, the phase 1 upper gate control signal (Φ1U), and the controller 102, and is selectably coupled to the gate of the phase 2 lower transistor (Q4) through switch S1. When it receives a control from the system 201 (e.g., VR system control) instructing it to shed phase 2, it controls the controller 102 to shut down (turn off) the phase 2 gate control signals (Φ2U, Φ2L), and it controls switch S1 to couple the gate of Q4 to the Q4 CTL signal from the phase shed block 203 rather than to the controller 102. The Q4 CTL signal tracks Φ1U (albeit possibly WITH a delay) so that Q4 turns on when Q1 is turned on.

In some embodiments, the phase shed block comprises circuitry to delay the turn on of Q4, relative to Q1, and to delay its turn off, relative to Q1, as well. The turn-on delay is to allow the induced current in the inactive winding (W2) to establish flow into the load 104. If Q4 is turned on too quickly, it could cause the current in W2 to flow the other way, leaching current away from the load. Similarly, it remains on, after Q1 has pulsed off, for a sufficient time for the current to drain out of winding 2.

(Note that transistor switches Q1 to Q4 are implemented with N-type MOS transistors in the depicted embodiment. However, they could be implemented with any suitable switch devices including P-type FETs, other types of transistors, and other switch configurations. Along these lines, while a 2-phase VR implementation is shown and described, the invention is not so limited. For example, higher numbers of phases could be used and could incorporate the principles taught herein. For example, multiple reverse-coupled inductor pairs could be used. Likewise, any suitable circuit, software implementation, or combination of the same, could be used to implement the controller and phase shed blocks. The phase shed block 203 is shown outside of the controller, for simplicity of explanation, but it, along with system 201, may be incorporated, in whole or in part, into the controller in some embodiments.)

Figure 3:
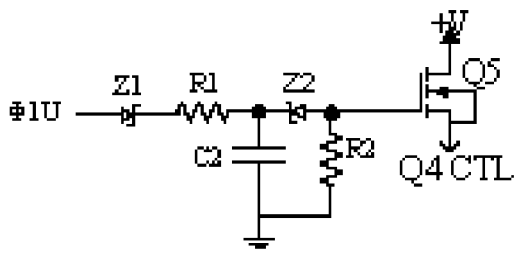
FIG. 3 is a schematic diagram of a circuit for controlling an induced leg of a dropped phase in accordance with some embodiments.

FIG. 3 shows an example of a circuit that could be used AS PART OF THE phase shed circuit to control Q4 when phase 2 is dropped. It comprises zener diodes Z1, Z2, resistors R1, R2, capacitor C2, and transistor Q5, all coupled together as shown. The input of zener diode Z1 is coupled to the Φ1U signal from the controller 102, while the source of Q5 is coupled to the Q4 CTL terminal of switch S1 to turn on the gate of Q4 in delayed response to the Φ1U signal asserting. The circuitry functions to turn on Q4 by a delayed amount after Φ1U asserts and to turn it off by a delayed amount when Φ1U de-asserts.

When Φ1U asserts, C2 charges, at a rate corresponding to R1 C2, resulting with the voltage at Z2 rising at a corresponding rate. Once it is large enough, the signal turns on Z2, which makes the effect of the signal delay more pronounced. When the diode Z2 turns on, Q5 turns on, causing Q4 to turn on, as well.

Resistor R2 determines the turn-off delay for Q5 and thus for Q4. When Φ1U goes low, zener Z1 blocks discharge through RI and the IU output, and so the signal discharges through R2. Thus, the amount of delay from when Φ1U goes low and when Q5 (and thus Q4) turns off corresponds to R2 C2. Accordingly, the turn on and turn off delays can be separately defined, and may be determined based on the particular characteristics of the regulator being used.

Figure 4:
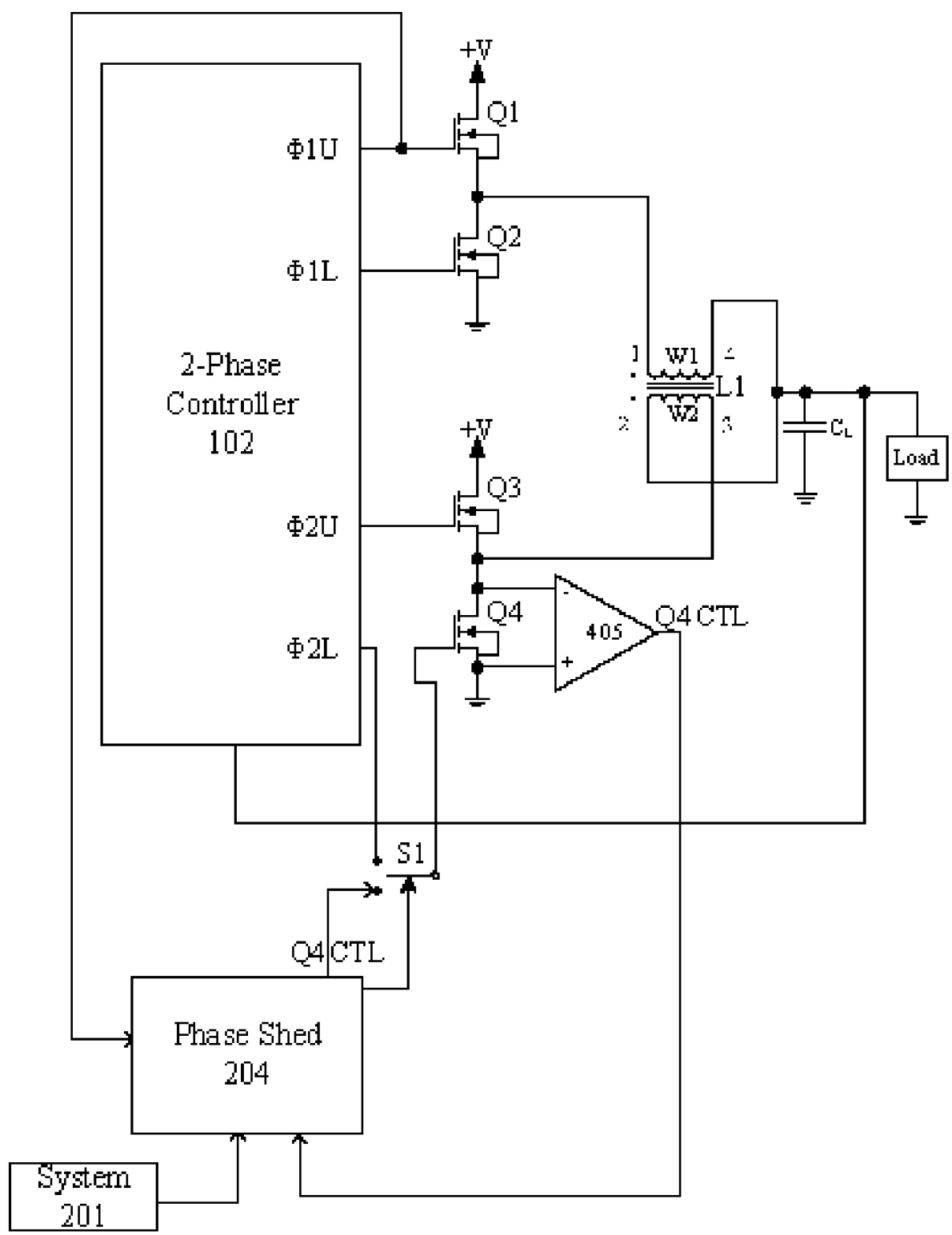
FIG. 4 is a schematic diagram of a 2-phase buck-type regulator with a reverse coupled inductor with phase shedding capability in accordance with some other embodiments.

FIG. 4 shows a VR such as is shown in FIG. 2 but with a different scheme for implementing turn on and turn off delay through the phase shed circuit 203 it employs a comparator 405 coupled across the drain/source of Q4, as shown. In this way, once a phase shed mode is entered (and switch S1 switches control of the Q4 gate to the phase shed circuit), the gate of Q4 is controlled to turn-on when the comparator senses a negative voltage from the drain to the source. Thus, Q4 will not turn on until the induced current begins flowing into the load and turns on the FET body diode. Similarly, it doesn't turn off until the current has stopped flowing. Note that once Q4 turns on, the current flows through the channel instead of the FET body diode. Since the channel has a lower resistance, the negative voltage to be sensed will be smaller for the comparator to measure. Accordingly, in some embodiments, comparators with suitably low offset and/or hysteresis (e.g., AC hysteresis with a capacitor coupled with a resistor in the positive feedback path) may be used.

Figure 5:
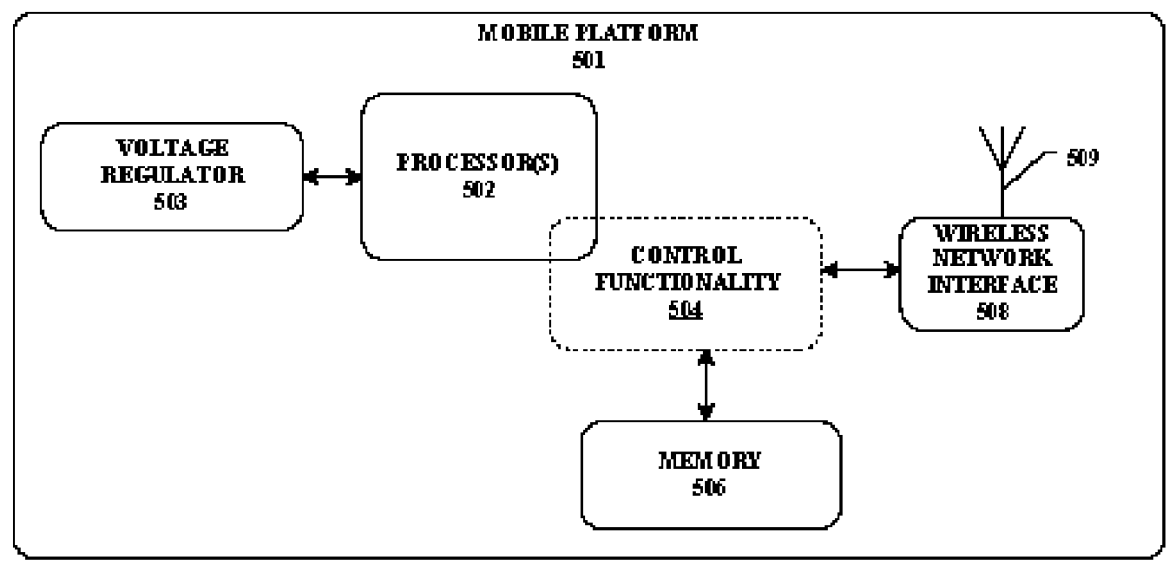
FIG. 5 is a block diagram of a computer system with a voltage regulator in accordance with some embodiments.

With reference to FIG. 5, one example of a portion of a mobile platform 501 (e.g., computing system such as a mobile personal computer, PDA, cell phone, or the like) is shown. The represented portion comprises one or more processors 502, voltage regulator 503, interface control functionality 504, memory 506, wireless network interface 508, and an antenna 509. The voltage regulator 503, which may be powered from an AC adaptor or battery pack, provides a DC supply to the one or more processors 502 it may be implemented with a VR having a reverse-coupled inductor and phase shedding capabilities discussed herein. The processor(s) 502 is coupled to the memory 506 and wireless network interface 508 through the control functionality 504. The control functionality may comprise one or more circuit blocks to perform various interface control functions (e.g., memory control, graphics control, I/O interface control, and the like. These circuits may be implemented on one or more separate chips and/or may be partially or wholly implemented within the processor(s) 502.

The memory 506 comprises one or more memory blocks to provide additional random access memory to the processor(s) 502 it may be implemented with any suitable memory including but not limited to dynamic random access memory, static random access memory, flash memory, or the like. The wireless network interface 508 is coupled to the antenna 509 to wirelessly couple the processor(s) 502 to a wireless network (not shown) such as a wireless local area network or a cellular network.

The mobile platform 501 may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. system comprising:
   one or more processors; and
   a voltage regulator coupled to the one or more processors to provide the one or more processors with a regulated DC voltage, the voltage regulator comprising:
   a reverse-coupled inductor having first and second windings, said regulator to have:
   a multi-phase mode wherein current is to be driven in the first winding and induced through the second winding during a first phase and driven through the second winding and induced through the first winding during a second phase, and
   a phase shed mode wherein current is not to be driven through the second winding but is to be induced through it when current is driven through the first winding; and
   a circuit to turn on a switch to provide a low resistance path for the induced current through the second winding during the phase shed mode, wherein the circuit comprises delay devices to delay turn-on of the switch after current is started to drive in the first winding.

2. The system of claim 1, wherein the switch comprises a MOS transistor that is to be turned on in the multi-phase mode during the first phase and in the phase shed mode when current is induced through the second winding.

3. The system of claim 2 comprising a second phase upper switch coupled to the second winding to drive current through it during the second phase in a multi-phase mode and to be turned off during the phase shed mode.

4. The system of claim 1, comprising an antenna to couple the one or more processors to a wireless network.

5. A voltage regulator comprising:
   a reverse-coupled inductor having first and second windings; and
   a control circuitry to operate in a multi-phase mode wherein during a first phase, current is driven through the first winding and induced through the second winding, and during a second phase, current is driven through the second winding and induced through the first winding;
   wherein the control circuitry to operate in a phase shed mode,
   wherein during the phase shed mode, current is not driven through the second winding but is induced through said second winding,
   wherein a low resistance path is provided to the second winding for at least part of the time when the current is induced through it, and
   wherein the low resistance path is provided by a circuit which comprises delay devices to delay turn-on of the low resistance path after current is started to drive in the first winding.

6. The voltage regulator of claim 5, wherein the circuit comprises a switch to provide the low resistance path for the induced current through the second winding when current is driven through the first winding.

7. The regulator of claim 6, wherein the switch comprises a MOS transistor that is to be turned on in the multi-phase mode during the first phase and in the phase shed mode when current is induced through the second winding.

8. The regulator of claim 5 comprising a second phase upper switch coupled to the second winding to drive current through it during the second phase in a multi-phase mode and to be turned off during the phase shed mode.

9. The regulator of claim 5, wherein the first and second windings of the reverse coupled inductor each comprise a transformer winding electrically coupled in series to a separate inductor.

10. An apparatus comprising:
    a transformer having first and second windings with sufficient magnetic coupling so that driven current in the first winding causes induced current in the second winding, the windings to be coupled to a load in a manner so that driven and induced current is fed into the load, the windings having sufficient inductance in their paths to implement a voltage regulator; and a circuitry to operate the transformer in a multi-phase mode where both windings are driven and a phase shed mode where current is not driven through the second winding but is induced through it when the first winding is driven, wherein a low resistance path is provided to the second winding during the phase shed mode for at least part of the time when current is driven through the first winding, and wherein the low resistance path is provided by a circuit which comprises delay devices to delay turn-on of the low resistance path after current is started to drive in the first winding.

11. The apparatus of claim 10, wherein the sufficient inductance comes from the transformer windings.

12. The apparatus of claim 10, wherein the sufficient inductance comes from separate inductors coupled in series with the windings.

13. An apparatus comprising:
a controller for a multi-phase voltage regulator with a coupled inductor having first and second windings, wherein current is induced through the second winding when the first winding is driven and induced through the first winding when the second winding is driven;
wherein the controller to operate in a multi-phase mode where the first and second windings are both driven, albeit during different phases, and to operate in a phase shed mode where the second winding is no longer driven, the controller to enable a low resistance path to the second winding for at least some time when the first winding is driven during the phase shed mode, wherein the low resistance path is provided by a circuit which comprises delay devices to delay turn-on of the low resistance path after current is started to drive in the first winding.

14. The apparatus of claim 13, wherein the controller comprises a switch to be coupled between the second winding and a ground node to provide the low resistance path to the second winding.

* * * * *